(12) United States Patent
Kimbrell et al.

(10) Patent No.: US 9,678,298 B2
(45) Date of Patent: Jun. 13, 2017

(54) CABLE TIE-DOWN BRACKET

(75) Inventors: Eddie Kimbrell, Dacula, GA (US); Ted Lichoulas, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 13/522,453

(22) PCT Filed: Jan. 14, 2011

(86) PCT No.: PCT/US2011/021267
§ 371 (c)(1),
(2), (4) Date: Aug. 15, 2012

(87) PCT Pub. No.: WO2011/088297
PCT Pub. Date: Jul. 21, 2011

(65) Prior Publication Data
US 2012/0318933 A1 Dec. 20, 2012

Related U.S. Application Data

(60) Provisional application No. 61/295,273, filed on Jan. 15, 2010.

(51) Int. Cl.
*G02B 6/44* (2006.01)
*F16L 3/08* (2006.01)

(52) U.S. Cl.
CPC .............. *G02B 6/4471* (2013.01); *F16L 3/08* (2013.01); *G02B 6/444* (2013.01); *G02B 6/4466* (2013.01)

(58) Field of Classification Search
CPC ..... F16L 5/00; F16L 3/00; H02G 3/22; H02G 3/0658; H02G 3/065; G02B 6/4471

USPC ............ 248/49, 56, 65, 68.1, 69, 74.1, 74.3
See application file for complete search history.

(56) References Cited

U.S. PATENT DOCUMENTS

| | | | | |
|---|---|---|---|---|
| 2,451,699 A | * | 10/1948 | Twaroski | F16L 3/223 248/74.3 |
| 2,601,211 A | * | 6/1952 | Neely | B01F 3/04801 123/179.9 |
| 2,813,692 A | * | 11/1957 | Peterson | H01B 17/306 174/152 R |
| 3,811,104 A | * | 5/1974 | Caldwell | H01R 13/6395 439/135 |
| 3,920,887 A | * | 11/1975 | Kloos | H05B 3/16 174/138 J |
| 4,339,213 A | * | 7/1982 | Gilmore | F16C 1/105 24/131 C |
| 4,350,839 A | * | 9/1982 | Lass | H02G 3/083 174/153 G |
| 4,461,521 A | * | 7/1984 | Sachs | H01R 4/646 174/41 |

(Continued)

OTHER PUBLICATIONS

International Search Report for PCT/US2011/021267, dated Mar. 15, 2011.

*Primary Examiner* — Muhammad Ijaz
(74) *Attorney, Agent, or Firm* — Dority & Manning, P.A.

(57) ABSTRACT

A modular cable tie-down bracket is provided. The cable tie-down bracket includes a pipe adapter mounting portion and a cable mounting portion integrally formed with the pipe adapter mounting portion. Further, the pipe adapter mounting portion is configured to be mounted to a pipe adapter and the cable mounting portion is configured to mount a cable. A cable mounting assembly is also provided.

19 Claims, 12 Drawing Sheets

(56) References Cited

U.S. PATENT DOCUMENTS

| | | | | |
|---|---|---|---|---|
| 4,718,856 A * | 1/1988 | Pinkerton | H01R 13/447 | 439/136 |
| 4,794,490 A * | 12/1988 | Epstein | H02G 3/18 | 174/60 |
| 4,917,615 A * | 4/1990 | Franks, Jr. | | 439/98 |
| 4,967,987 A * | 11/1990 | Swank | F16C 1/106 | 248/56 |
| 4,998,692 A * | 3/1991 | Shigeki | F16L 3/1222 | 248/27.3 |
| D325,564 S * | 4/1992 | Lemke | | D13/154 |
| 5,422,436 A * | 6/1995 | Zachrai | H02G 3/16 | 174/152 G |
| 5,754,724 A | 5/1998 | Peterson et al. | | |
| 5,793,920 A * | 8/1998 | Wilkins | G02B 6/4446 | 385/135 |
| D398,313 S * | 9/1998 | Allen | | D13/118 |
| 5,828,807 A | 10/1998 | Tucker et al. | | |
| 5,912,431 A * | 6/1999 | Sheehan | H02G 3/0658 | 174/653 |
| 5,971,329 A * | 10/1999 | Hickey | F16L 3/227 | 248/316.7 |
| 6,053,456 A * | 4/2000 | Dispenza | F16L 5/10 | 248/56 |
| 6,095,462 A * | 8/2000 | Morgan | F16L 3/003 | 248/316.4 |
| 6,466,728 B1 * | 10/2002 | Radloff | G02B 6/266 | 385/134 |
| 6,490,947 B2 * | 12/2002 | Burger | F16C 1/105 | 248/56 |
| D479,793 S * | 9/2003 | Jones | | D8/349 |
| D487,427 S * | 3/2004 | Franks, Jr. | | D13/133 |
| 6,725,524 B2 * | 4/2004 | Lin | H02K 5/225 | 29/596 |
| 6,769,652 B1 * | 8/2004 | Capan | B60T 17/046 | 248/65 |
| D512,376 S * | 12/2005 | Franks, Jr. | | D13/133 |
| 7,345,241 B2 * | 3/2008 | Caveney | H01R 9/2416 | 174/135 |
| 7,462,042 B2 * | 12/2008 | Chawgo | H01R 4/64 | 439/92 |
| 7,537,183 B2 * | 5/2009 | Karamanos | F24D 19/02 | 138/103 |
| 7,582,829 B2 * | 9/2009 | Yan | H02G 3/0666 | 174/50 |
| 7,731,512 B1 * | 6/2010 | Montena | H01R 4/64 | 439/108 |
| 2003/0102663 A1 * | 6/2003 | Chu | F16L 25/0018 | 285/23 |
| 2003/0230689 A1 * | 12/2003 | Palfenier | F16B 2/20 | 248/309.1 |
| 2004/0182971 A1 * | 9/2004 | Sharma | G02B 6/3897 | 248/49 |
| 2006/0030181 A1 * | 2/2006 | Blake | H01R 24/542 | 439/95 |
| 2008/0251652 A1 * | 10/2008 | Hollender | H02G 3/30 | 248/65 |
| 2009/0021925 A1 | 1/2009 | Heimann et al. | | |
| 2009/0162019 A1 | 6/2009 | Lichoulas et al. | | |
| 2009/0173844 A1 * | 7/2009 | Huo | H02G 3/32 | 248/65 |
| 2012/0318933 A1 * | 12/2012 | Kimbrell | G02B 6/4471 | 248/56 |
| 2016/0047493 A1 * | 2/2016 | Dickinson | F16L 3/08 | 248/73 |

\* cited by examiner

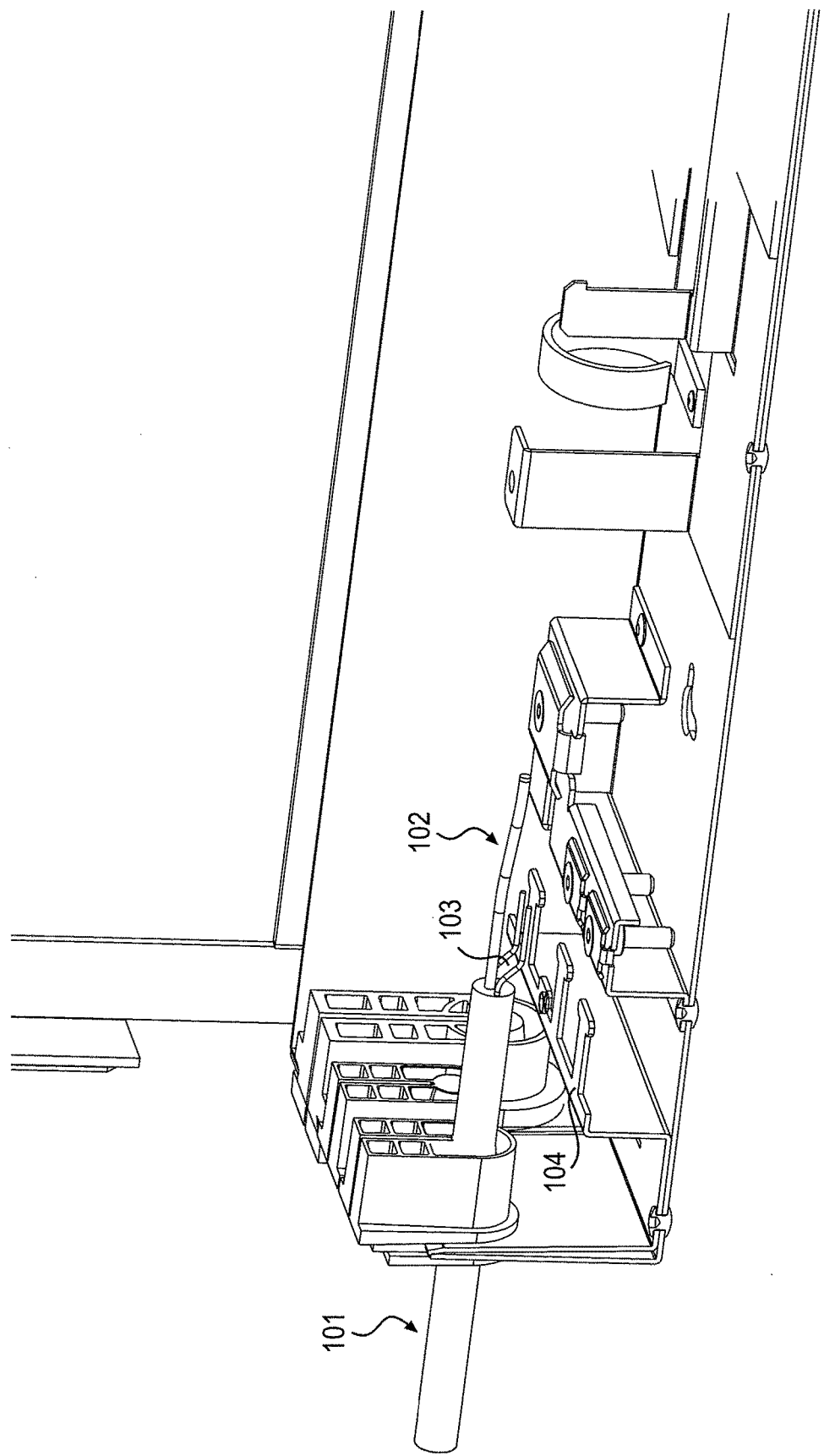

CABLE TIE-DOWN BRACKET

CROSS-REFERENCE TO RELATED PATENT APPLICATIONS

The present application claims priority from U.S. Provisional Application No. 61/295,273, filed on Jan. 15, 2010, the entire disclosure of which is incorporated herein by reference in its entirety.

BACKGROUND

1. Field of the Invention

Apparatuses consistent with the present invention relate to a bracket for securing cables. More particularly, these apparatuses relate to a cable-tie down bracket for anchoring a cable or its constituent members to a tie down region within an enclosure.

2. Description of the Related Art

With the need to provide high speed data communications, telecommunications and CATV service providers are switching from twisted pair, CAT-5/6, and coaxial cables to fiber optic cables for their communications backbone, for residential users, and for business users. Based on common industry practices, most telecommunications and CATV service providers run fiber optic feeder cables to an enclosure and re-route optical fibers to smaller distribution cables. In many cases, these feeder and distribution cables are routed to an enclosure using a cable duct which serves to protect the cable and facilitate routing within a structure (residence, multi-dwelling unit, business, etc).

An example of such an enclosure box can be found in PCT Application No. PCT/US2010/052673 (the '673 application), the contents of which are incorporated herein in its entirety. An exemplary aspect of the '673 application is that a cable port mounting plate is removably attached to the internal chassis and the enclosure box. The cable port mounting plate allows entry and exit of cables into the enclosure after which these the cables may be separated into the respective constituents. The '673 application allows a designer to use a variety of configurations for the cable port mounting plate.

Based on common industry practice, cables entering an enclosure are strain relieved within the enclosure by anchoring the cable's outer jacket or the cable's strength members to a tie down region within the enclosure. In order to reduce the manufacturing complexity of the enclosure, the tie down region of the enclosure in typically arranged in a same plane as the enclosures input and output ports, and typically arranged in a side-by-side orientation. Other cable tie down configurations are possible but are complex to manufacture and typically expensive.

FIGS. 1A and 1B illustrate a perspective view of an enclosure box in which an input cable 101 is anchored to a tie-down region 104 using the central strength members 103. The optical fiber 102 is pulled from the cable and fed to other devices. For example, the optical fiber 102 may be fed to a splice tray, an adapter, etc. or coiled and stored within the enclosure for future splicing needs. Typically the feeder/input cable enters the enclosure from the bottom left side of the unit thru the grommets or pipe adapters. Once the cable is brought inside of the enclosure the outer jacket is removed from the cable exposing the fiber bundle(s) and the central strength member. The central strength member is trimmed to the appropriate length needed and is secured as previously mentioned. The fiber bundle is typically routed in a clockwise direction in a racetrack shape/configuration around the inside of the slack storage region of the enclosure and is fed thru/inserted inside of the cable management rings. Typically several revolutions of the cable are made in order to provide sufficient slack length for future splicing needs. At this point one or more individual fibers are separated from the bundle and are routed and spliced to pigtails, jumpers or other fibers within the enclosure and/or splice tray.

The cable 101 is typically anchored to the tie-down region 104 using a cable tie or a hose clamp. In some cases the cable strength member is a multifilament Kevlar/other high performance fiber bundle as opposed to a pultruded fiberglass rod. When this is the case these central strength fibers are wrapped around the cable management bracket and secured typically with a tie knot. As seen from FIG. 1B, the cable may enter the enclosure from a hole 105. A plurality of these holes are provided at the base of the enclosure box. However, designers may wish to use different configurations of the entry holes 105 in which the holes 105 may not be in the same plane as each other. For example, FIG. 3C of the '673 application provides a cable port mounting plate 201 in which the holes 205 are not in the same plane.

If the entry holes 105 in FIG. 1A are not on the same horizontal plane as the cable tie-down region 104, the cable 101 has to be bent and the strength members 103 have to be pulled further down to secure them with the tie-down region. The central strength members are stiff and it may be difficult to route the strength members such that they can reach the tie-down region 104.

Therefore, there is a need for a more flexible design for anchoring the incoming cables such that the design can easily adapt to varying configurations of the input cable holes.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

Exemplary implementations of the present invention relate to fiber optic cables that include optical fibers and strength members. However, these implementations may be easily extended to other cables having conductors which are not optical fibers. For example, the disclosed implementations may be applicable to a cable having metallic conductors as its constituents.

According to an exemplary implementation, a modular cable tie-down bracket is provided. The cable tie-down bracket includes a pipe adapter mounting portion and a cable mounting portion integrally formed with the pipe adapter mounting portion. Further, the pipe adapter mounting portion is configured to be mounted to a pipe adapter and the cable mounting portion is configured to mount a cable.

BRIEF DESCRIPTION OF THE DRAWINGS

The above and/or other aspects of the present invention will be made more apparent by describing certain exemplary implementations of the present invention with reference to the accompanying drawings, in which:

FIGS. 1A and 1B illustrate an enclosure box and a cable entering the enclosure box to describe problems with conventional designs.

DETAILED DESCRIPTION

Figure 1B:
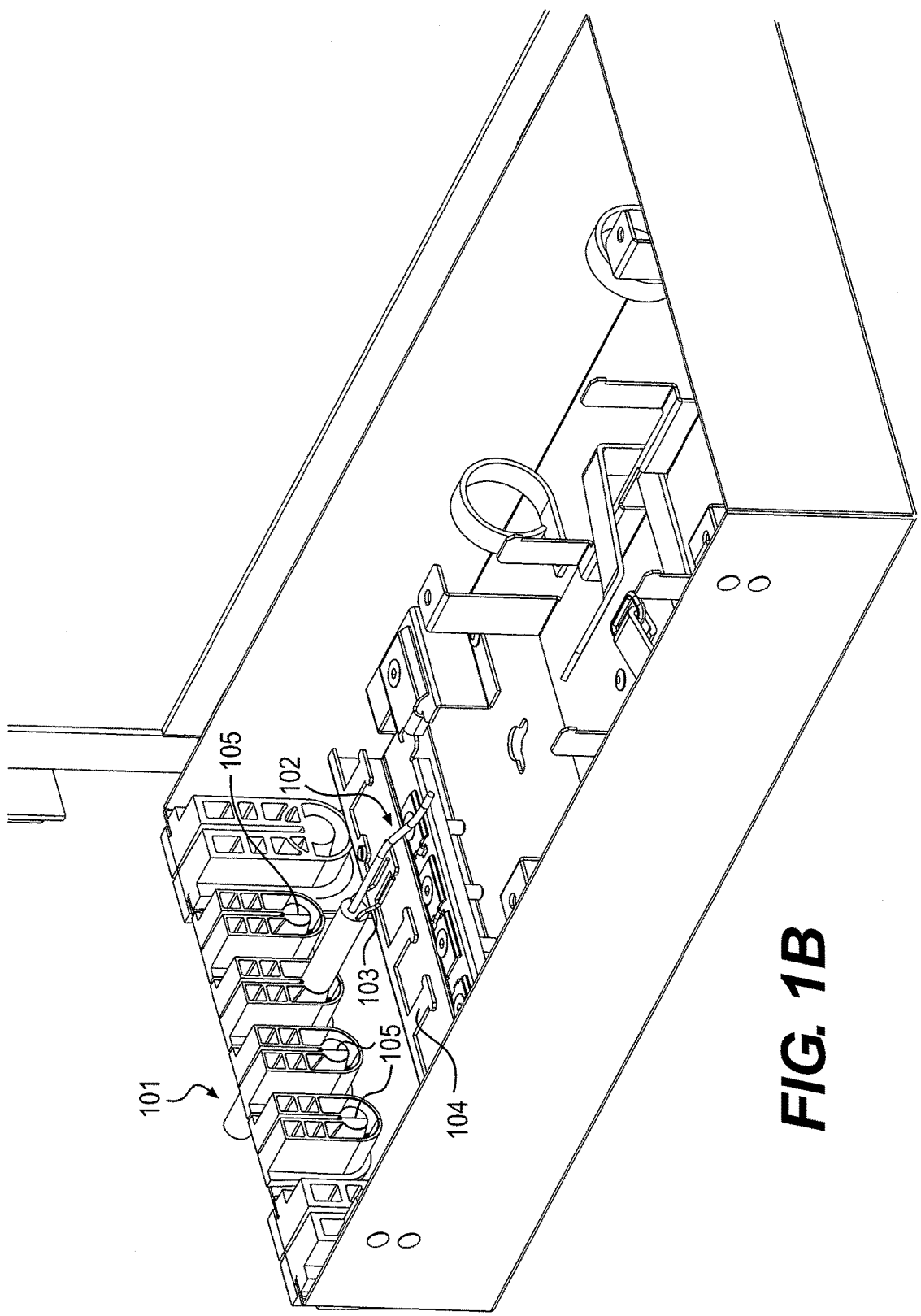

Certain exemplary implementations of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 2:
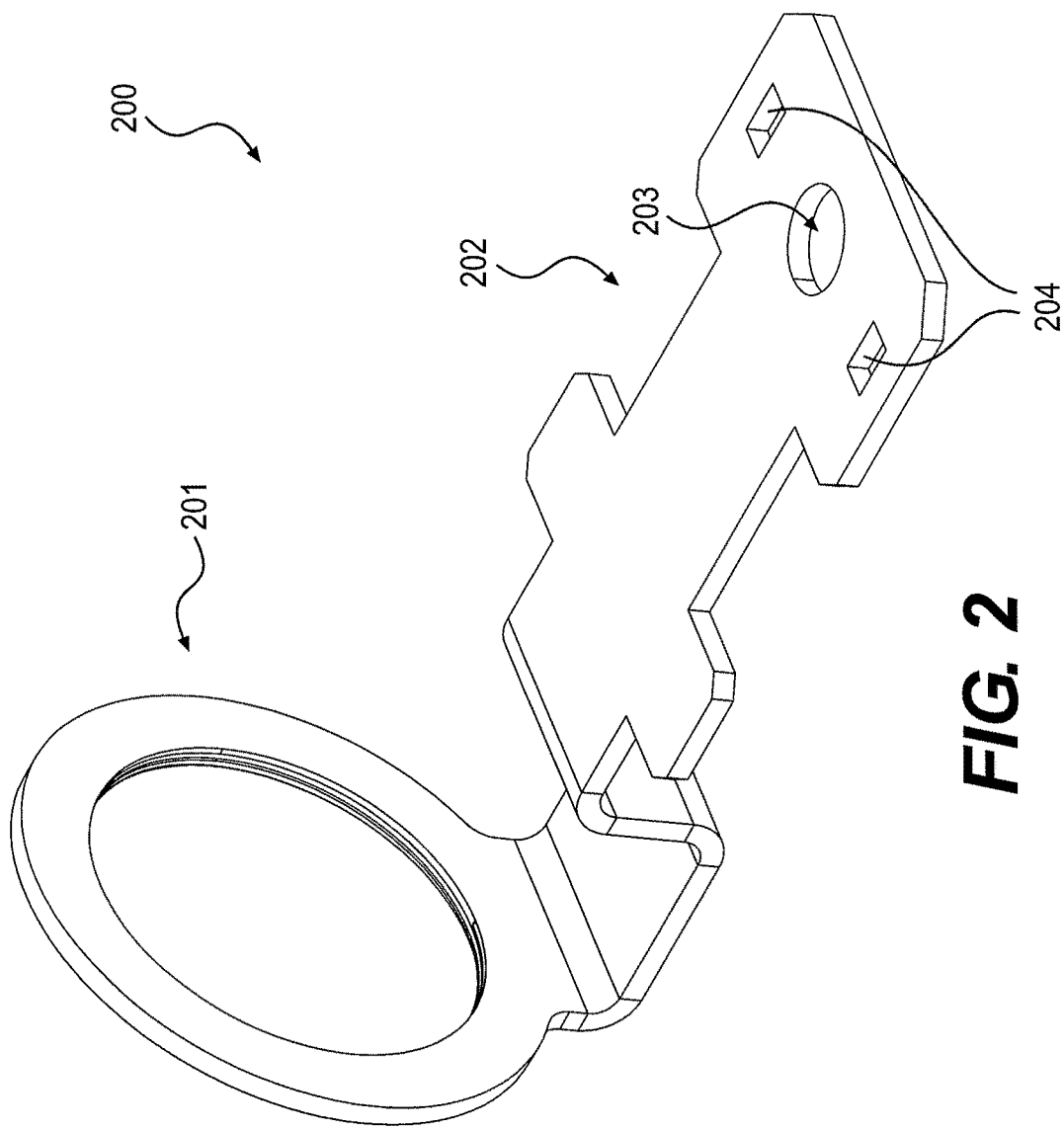
FIG. 2 illustrates a cable tie-down bracket according to an exemplary implementation.

According to an exemplary implementation, a cable tie-down bracket 200 is described with respect to FIG. 2. The cable tie-down bracket 200 includes a pipe adapter mounting portion 201 and a cable mounting portion 202. The pipe adapter mounting portion 201 takes the shape of the pipe adapter, to which it is secured. In FIG. 2, the pipe adapter mounting portion 201 is circular in shape, however, it can take a different shape based on the shape of the pipe adapter to which it is secured or mounted. The cable mounting portion 202 is a flat portion to which a cable is secured or anchored. The cable mounting portion 202 may further include a screw hole 203 in which a threaded insert may be installed and one or more openings 204. These openings 204 may receive anti-rotation tabs from item 303.

It should be noted that the cable mounting portion 202 and the pipe adapter mounting portion 201 are integrally formed, i.e., they are formed as one piece. However, it may also be possible that they are mechanically attached or mounted with each other.

The pipe adapter mounting portion 201 may also be threaded as shown in FIG. 2.

Figure 3:
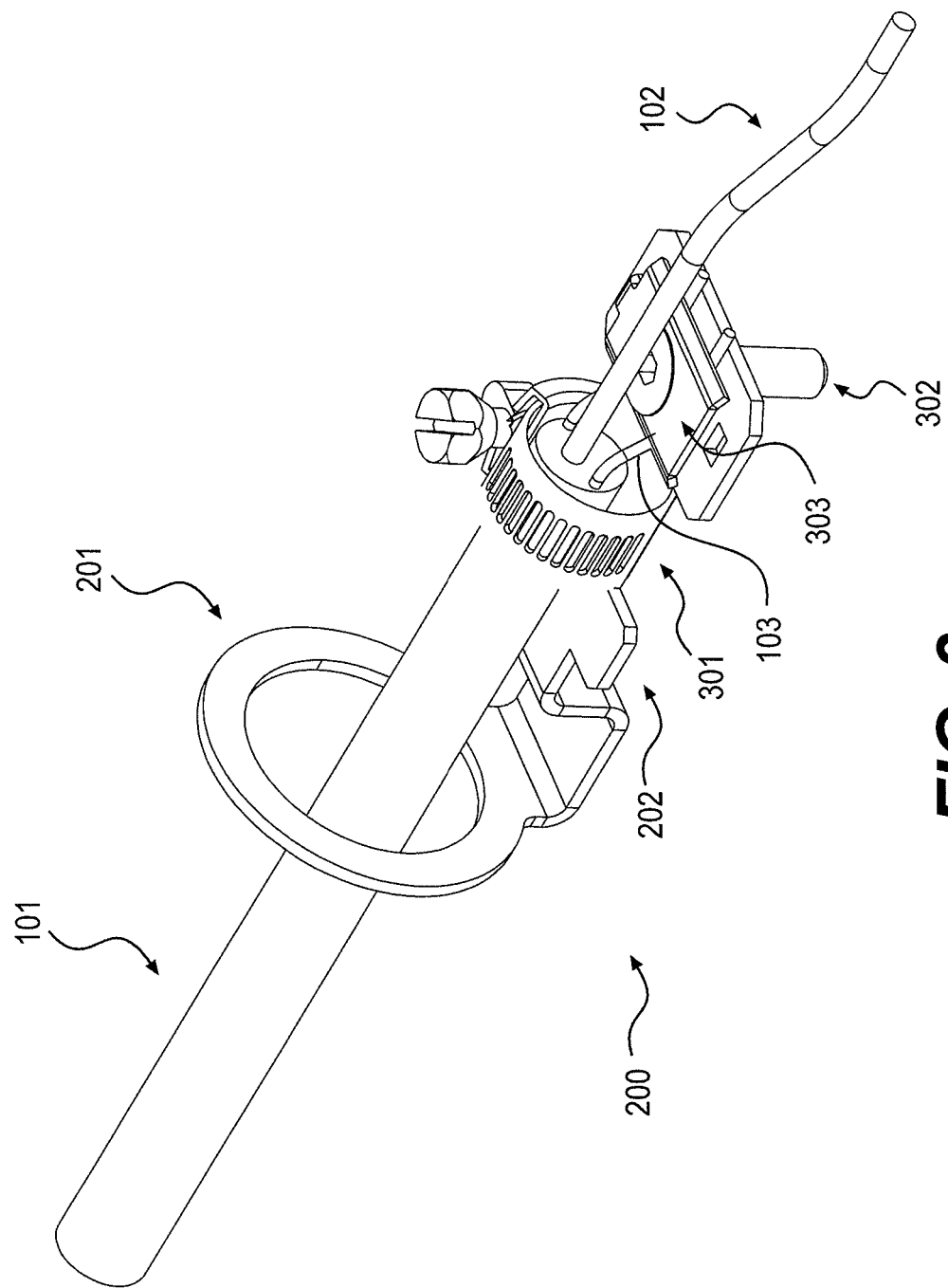
FIG. 3 illustrates a cable assembly in which a cable is anchored to the cable tie-down bracket according to an exemplary implementation.

FIG. 3 illustrates a cable assembly in which a cable is anchored to the cable tie-down bracket 200. A cable 101 passes through the pipe adapter mounting portion 201 and is clamped to the cable mounting portion 202 using a cable clamp 301. The strength members 103 are pulled from the cable 101 and secured to the cable mounting portion 202 using a clamping plate 303 and a screw 302 which secures the clamping plate 303 to the cable mounting portion 202.

One of the advantages of the above described cable tie-down bracket is that it can be mounted at the point where the cable (in particular a fiber optic cable) enters or exits a cable duct within an enclosure. This new method allows the cable to be secured near the access point as opposed to a centralized tie down region within the enclosure, which is the case in FIGS. 1A and 1B.

Figure 4A:
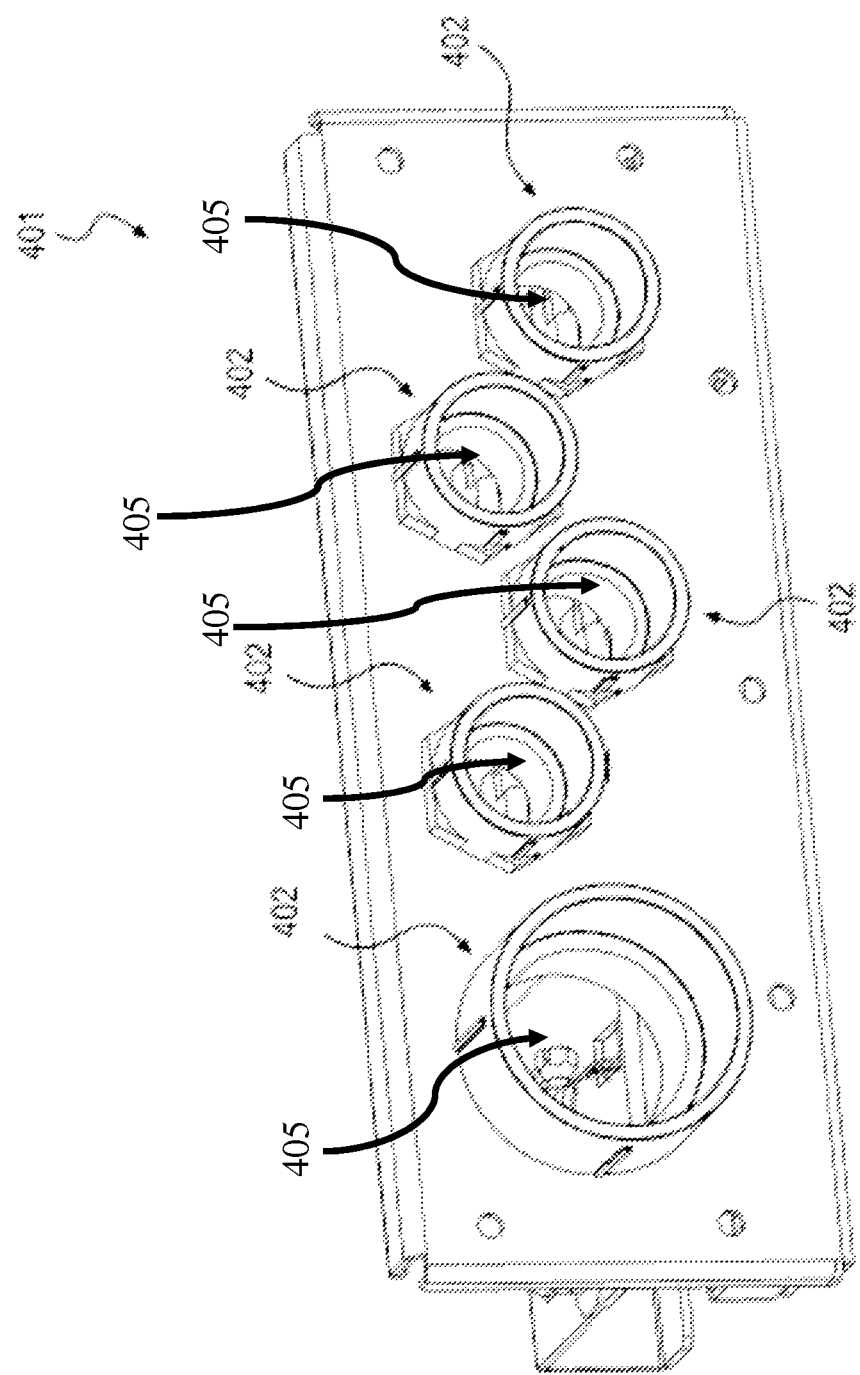
FIGS. 4A and 4B illustrate a cable port mounting plate with a plurality of pipe adapters.
Figure 4B:
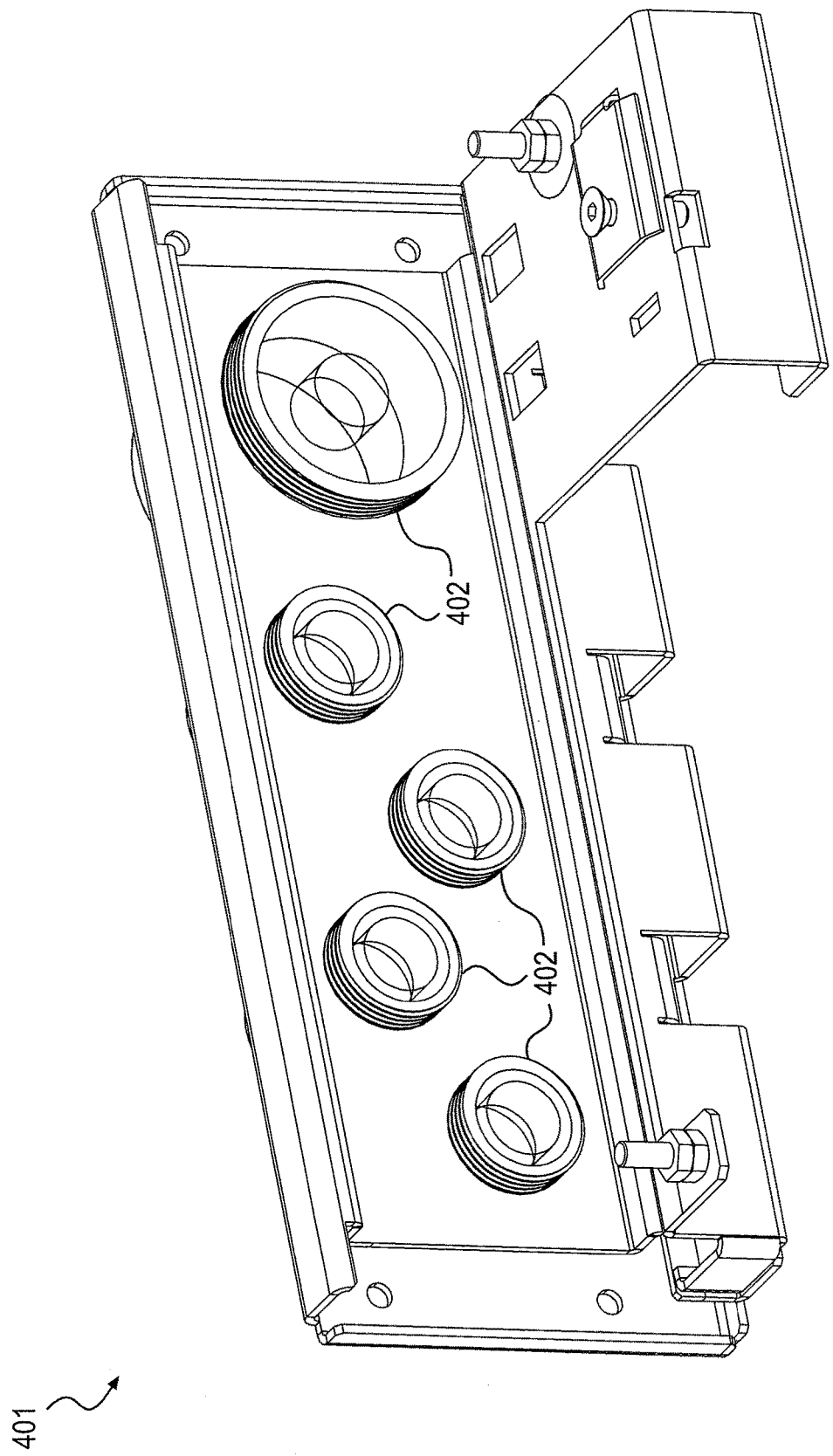
Figure 4C:
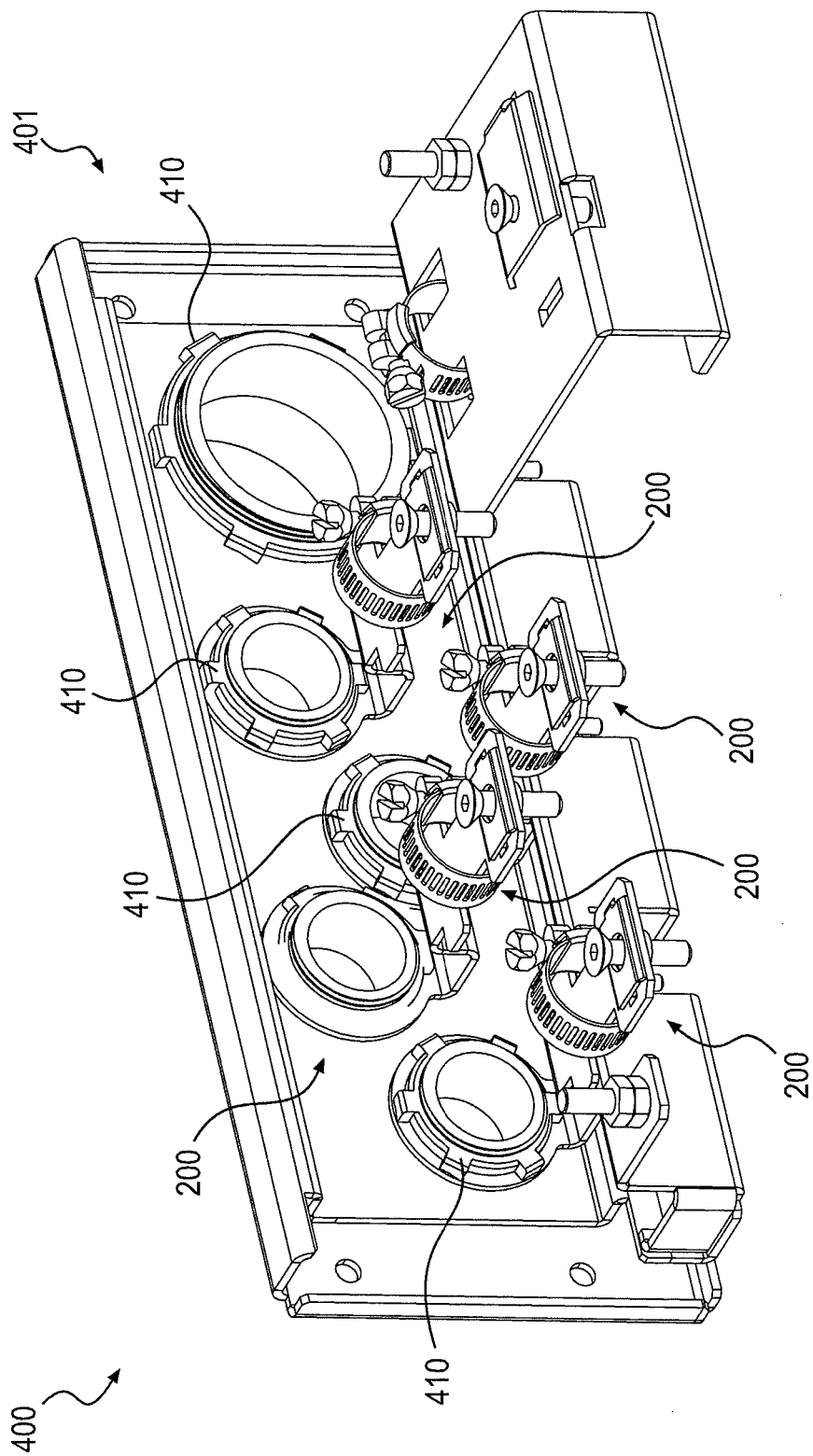
FIG. 4C illustrates an exemplary cable mounting assembly including a cable port mounting plate with a plurality of cable tie-down brackets mounted to the pipe adapters.

To better understand the above advantage, reference is now made to FIGS. 4A, 4B, and 4C. FIG. 4A describes a cable port mounting plate 401 with a plurality of pipe adapters 402. The pipe adapters 402 are secured into respective holes 405 in the cable port mounting plate 401. As seen from FIG. 4A, the pipe adapters 402 are not all placed on the same horizontal plane and are also not all of the same size. FIG. 4B illustrates an alternative view of the cable port mounting plate with the pipe adapters 402 as shown in FIG. 4A. FIG. 4B illustrates that the pipe adapters are threaded at one end.

FIG. 4C illustrates a cable mounting assembly 400 including a cable port mounting plate 401 with a plurality of cable tie-down brackets 200 mounted to the pipe adapters 402. If the pipe adapter mounting portion 201 of the cable tie-down bracket 200 is not threaded, a ring 410 may be provided to secure the pipe adapter mounting portion 201 to the cable port mounting plate 401 and the pipe adapter 402. The pipe adapter 402 is assumed to be threaded.

Figure 5:
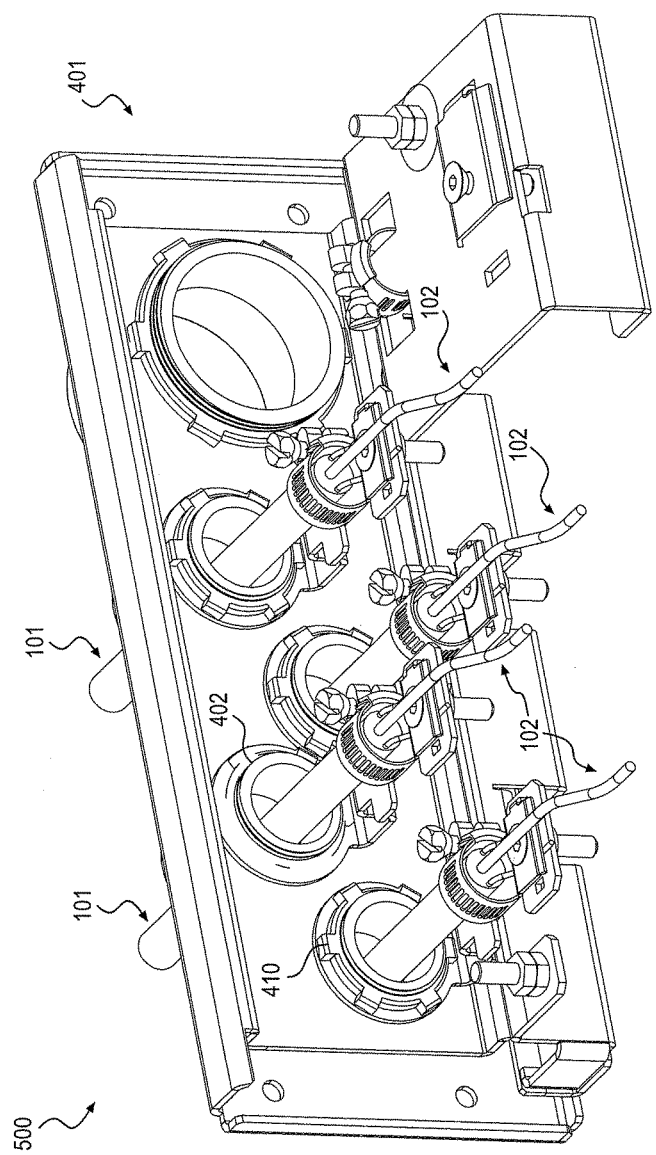
FIG. 5 illustrates the cable mounting assembly of FIG. 4C with cables anchored to the cable tie-down brackets.

FIG. 5 illustrates a cable mounting assembly 500 in which the cables 101 are anchored to the cable tie-down bracket 200. The cable mounting assembly includes a cable port mounting plate 401, a plurality of pipe adapters 402, cable tie-down brackets 200 mounted to the pipe adapters 402 with or without rings 410.

Figure 6:
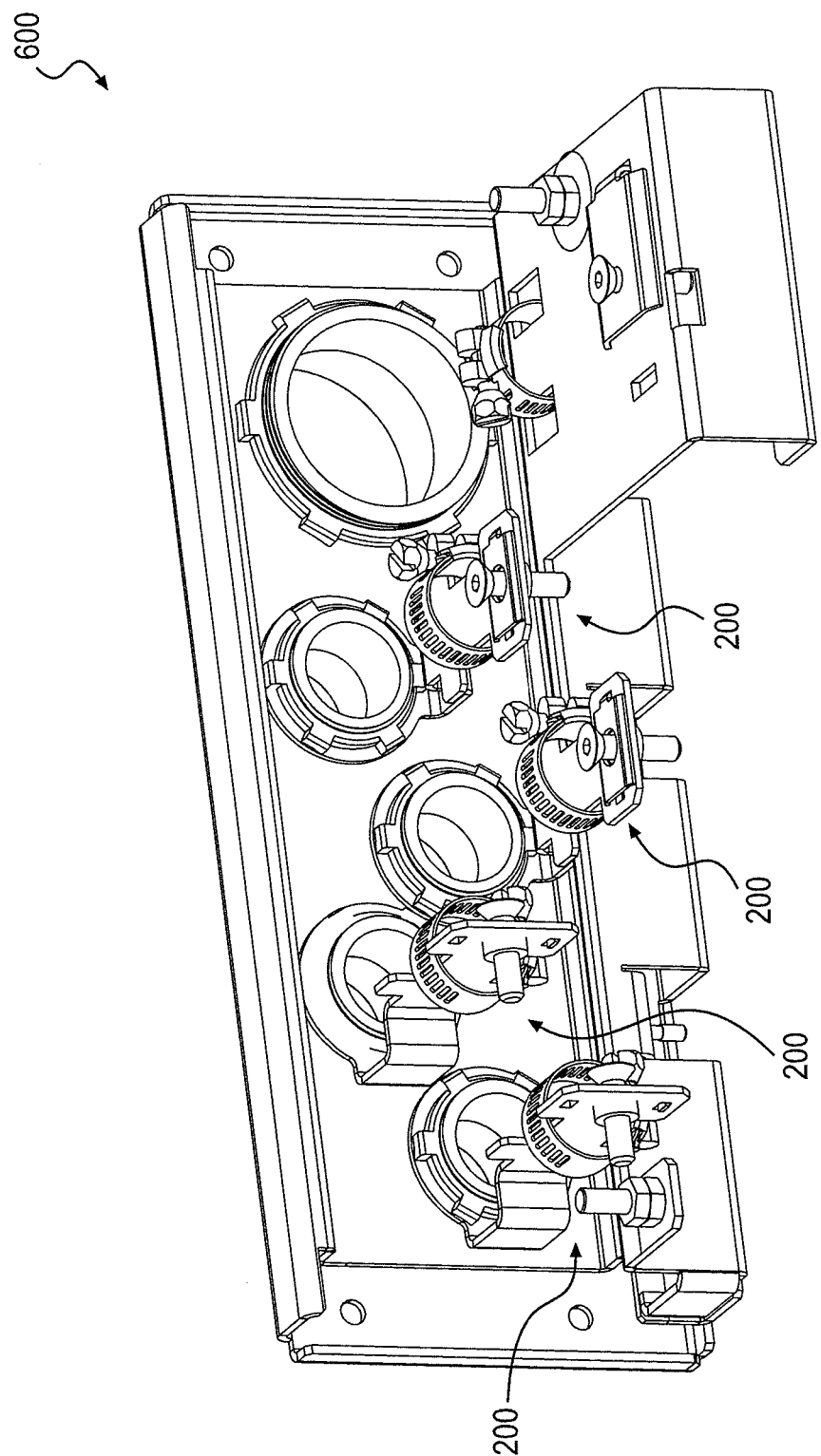
FIG. 6 illustrates another exemplary cable mounting assembly.

FIG. 6 illustrates another cable mounting assembly 600 in which the two left most cable tie-down brackets 200 are rotated about the cable axis. That is, some of the cable tie-down brackets 200 are rotated with respect to other cable tie-down brackets. The ability to rotate the cable tie-down bracket so that they can be positioned at different angles is advantageous for installers as it provides ease of mounting and accessing adjacent cables. Such a feature allows for greater number of holes to be present in the cable port mounting plate and allows for a more flexible design.

Figure 7:
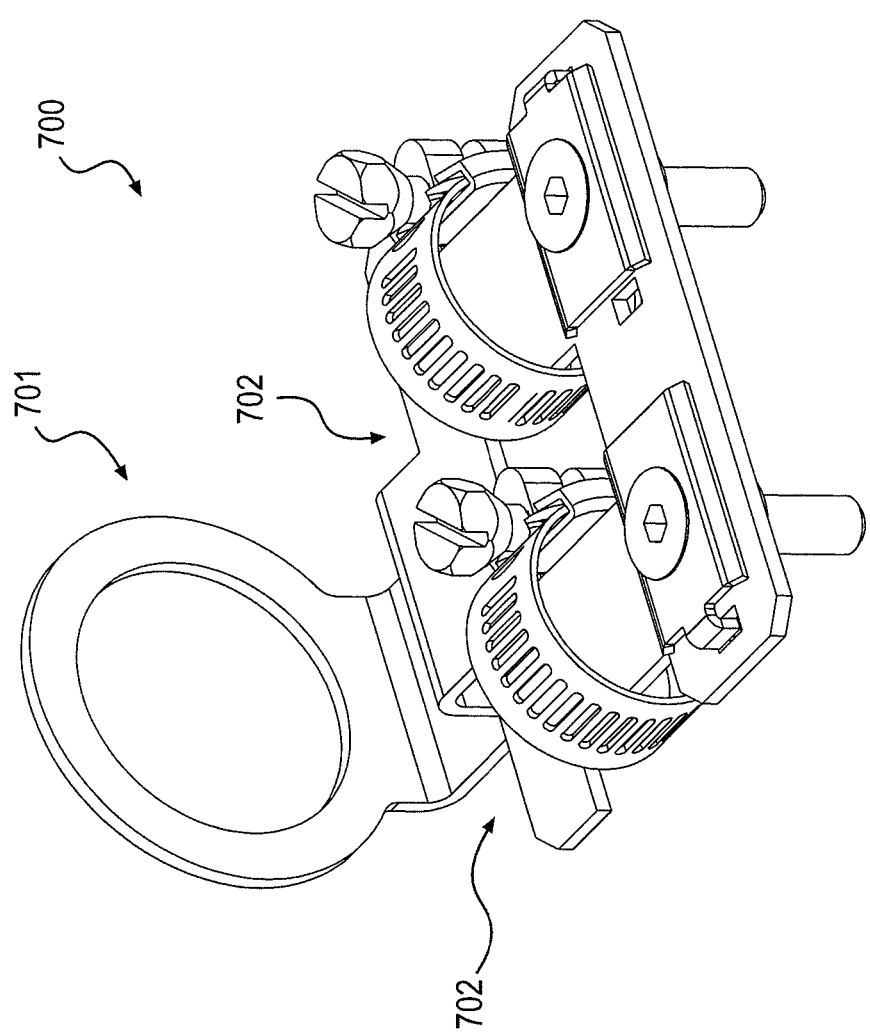
FIG. 7 illustrates another exemplary implementation of a cable tie-down bracket.

FIG. 7 illustrates another exemplary implementation of a cable tie-down bracket. The cable tie-down bracket 700 includes a single pipe adapter mounting portion 701, which is similar to the pipe adapter mounting portion 201. The difference between the cable tie-down bracket 700 and the cable tie-down bracket 200 is that the cable tie-down bracket 700 has a plurality of cable mounting portions 702. Each of the plurality of cable mounting portions are configured to anchor individual cables using their respective strength members. The cable tie-down bracket 700 also includes as many screw holes as the number of cable mounting portions 702.

Figure 8:
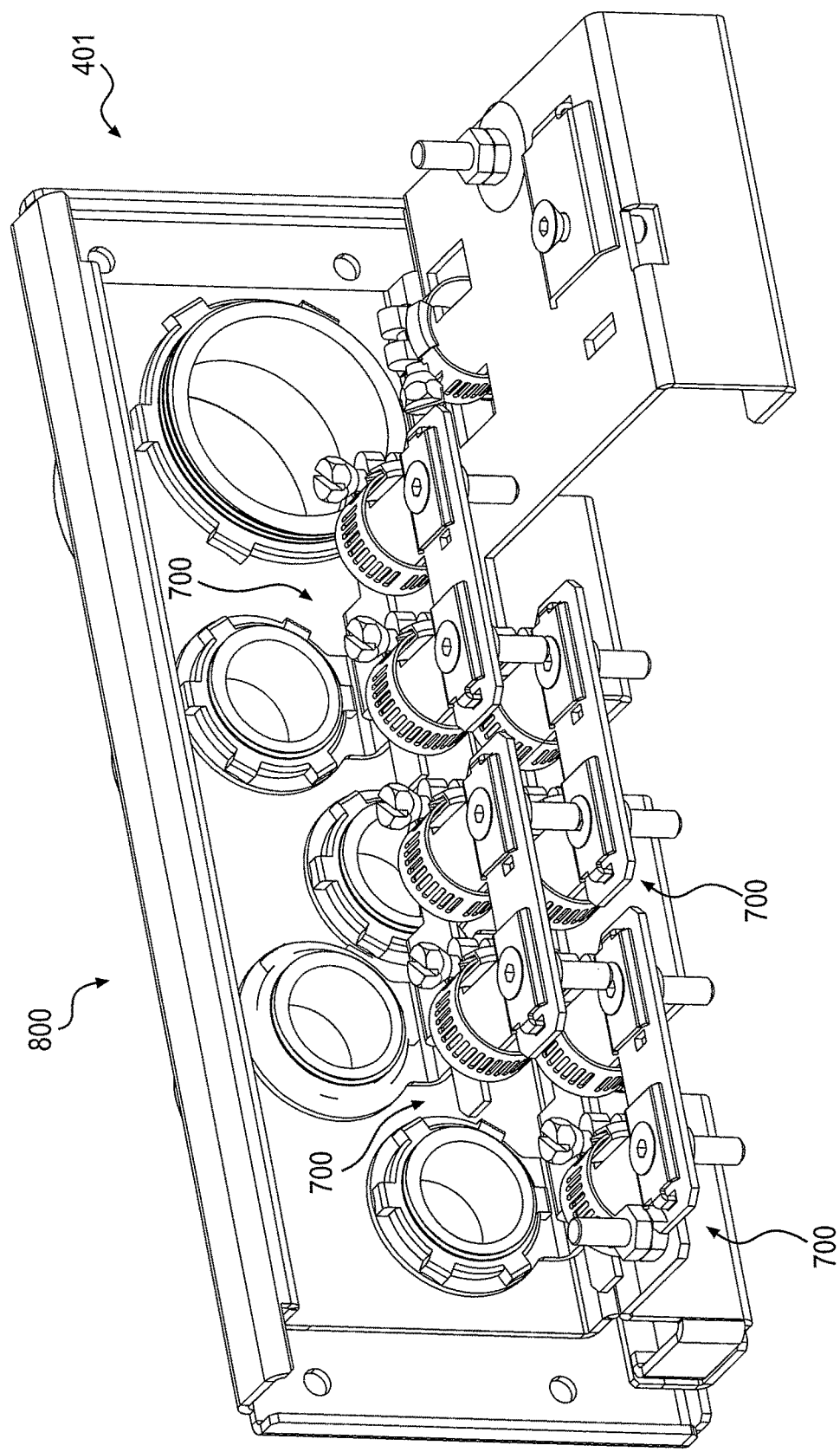
FIG. 8 illustrates an exemplary cable mounting assembly using the cable tie-down bracket of FIG. 7.

FIG. 8 illustrates a cable mounting assembly 800 similar to the cable mounting assembly 400 of FIG. 4C. The cable mounting assembly 800 uses the cable tie-down bracket 700 in place of the cable tie-down bracket 200.

Figure 9:
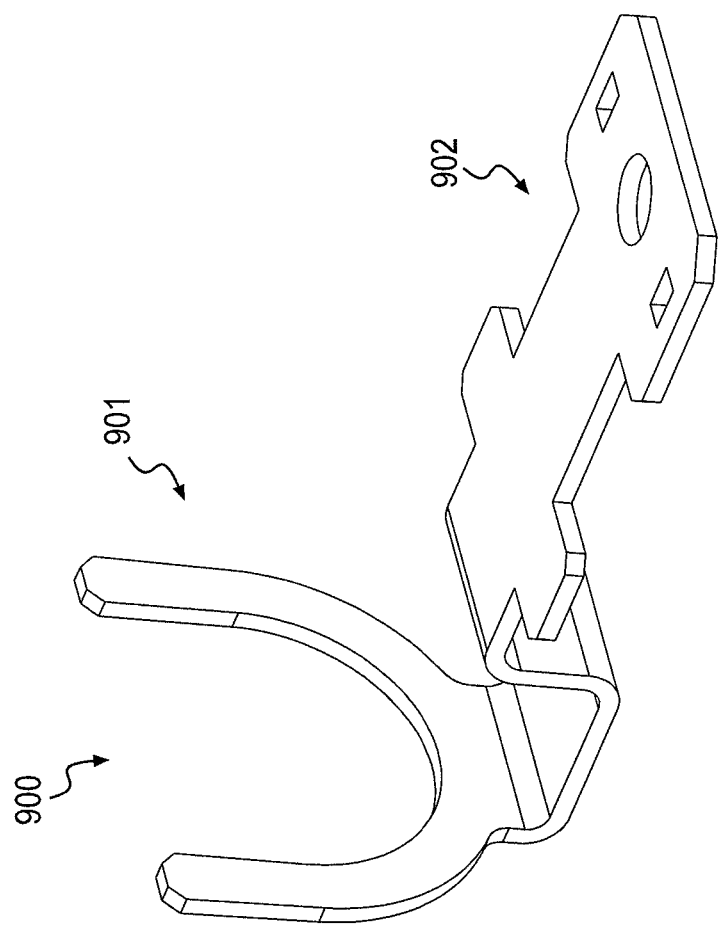
FIG. 9 illustrates another exemplary implementation of a cable tie-down bracket.

FIG. 9 illustrates another exemplary implementation of a cable tie-down bracket. The cable tie-down bracket 900 is similar to the cable tie-down bracket 200 except that the pipe adapter mounting portion 901 is U-shaped instead of being circular. The cable mounting portion 902 is similar to the cable mounting portion 202.

Next, some of the advantages of the above exemplary implementations are discussed.

The exemplary implementations described above make it easier to access the cables when the cable grommet parts (pipe adapters) are not mounted on the same plane and also reduces the excessive bending in the fiber optic cables. Excessive bending may result in excessive bend radii which causes increased attenuation.

Further, the cable tie-down brackets can be made from a dissimilar material than the base enclosure such as but not limited to stainless steel.

The cable tie-down brackets can also have a grounding mechanism, such as a ground stud to allow armored fiber optic cables to be grounded at the point the access. These ground studs can then be connected to the enclosures grounding system via a flexible grounding cable.

The exemplary cable tie-down bracket described above can be used to secure and strain relief fiber optic cables to any NPT (National Pipe Taper) fitting that is installed on a bulkhead or wall. This feature allows an installer flexibility when running fiber optic cables to a communications closet as opposed to an enclosure.

The cable tie-down brackets can be rotated about the cable axis and positioned at different angles as needed for ease of mounting and accessing adjacent cables. The cable tie-down brackets can be mounted directly to the conduit adapter fittings (pipe adapters) entering the enclosure. The cable tie-down brackets are modular and therefore, can easily be replaced or upgraded in the field as needed without having to replace the complete enclosure.

The cable tie-down bracket can be ganged as required to mount multiple cables in the same cable port and at different angles. The cable tie-down bracket can be used to isolate and discretely ground specific cables as opposed to the complete enclosure. This feature is possible at least because each of the cable tie-down brackets may have their own grounding mechanism.

The exemplary cable tie-down bracket can be adapted to mount cables from more than one side of the bracket and therefore one bracket can accept cables from more that one port if desired.

The foregoing exemplary implementations are merely exemplary and are not to be construed as limiting the present invention. The present teaching can be readily applied to other types of apparatuses. Also, the description of the exemplary implementations of the present invention is intended to be illustrative, and not to limit the scope of the claims, and many alternatives, modifications, and variations will be apparent to those skilled in the art.

What is claimed is:

1. A modular cable tie-down bracket comprising:
a pipe adapter mounting portion;
a cable mounting portion integrally formed with the pipe adapter mounting portion, the cable mounting portion comprising a first portion extending transversely from the pipe adapter mounting portion, a second portion extending from the first portion parallel to the pipe adapter mounting portion, and a third portion extending transversely from the second portion, the third portion defining intermediate opposing cut-outs, the cut-outs defined in opposing edges of the third portion; and
a clamping plate securable to the third portion of the cable mounting portion,
wherein the pipe adapter mounting portion is configured to be mounted to a pipe adapter and the cable mounting portion is configured to mount at least one of a plurality of cables,
wherein the pipe adapter is configured to be mounted to a hole in a mounting plate for allowing entry and exit of the plurality of cables, and
wherein the third portion further defines an opening and the clamping plate includes an anti-rotation tab, the anti-rotation tab insertable into the opening.

2. The modular cable tie-down bracket of claim 1, wherein the pipe adapter mounting portion is circular in shape.

3. The modular cable tie-down bracket of claim 1, wherein the pipe adapter mounting portion is U-shaped.

4. The modular cable tie-down bracket of claim 1, wherein the pipe adapter mounting portion is threaded.

5. The modular cable tie-down bracket of claim 1 further including a screw hole.

6. The modular cable tie-down bracket of claim 1, wherein the modular cable tie-down bracket is further configured to be rotatable around the pipe adapter.

7. The modular cable tie-down bracket of claim 6, wherein the modular cable tie-down bracket is further configured to be rotatable around the pipe adapter about an axis of a pipe passing through the pipe adapter.

8. The modular cable tie-down bracket of claim 1, wherein the pipe adapter mounting portion comprises a threaded surface configured to mount to a threaded surface of the pipe adapter.

9. The modular cable tie-down bracket of claim 1, further comprising a grounding stud configured to provide electrical grounding to the cable mounting portion.

10. A cable mounting assembly comprising:
a cable port mounting plate for allowing entry and exit of cables into an enclosure, the cable port mounting plate including a first hole and a second hole;
a first pipe adapter mounted in the first hole;
a second pipe adapter mounted in the second hole;
a first modular cable tie-down bracket mounted to the first pipe adapter; and
a second modular cable tie-down bracket mounted to the second pipe adapter,
wherein the first modular cable tie-down bracket comprises:
a first pipe adapter mounting portion configured to be mounted to the first pipe adapter;
a first cable mounting portion integrally formed with the first pipe adapter mounting portion and configured to mount a cable, the first cable mounting portion comprising a first portion extending transversely from the first pipe adapter mounting portion, a second portion extending from the first portion parallel to the first pipe adapter mounting portion, and a third portion extending transversely from the second portion, the third portion defining intermediate opposing cut-outs; and
a first clamping plate securable to the third portion of the first cable mounting portion, and
wherein the second modular cable tie-down bracket comprises:
a second pipe adapter mounting portion configured to be mounted to the second pipe adapter;
a second cable mounting portion integrally formed with and extending transversely from the second pipe adapter mounting portion and configured to mount a cable; and
a second clamping plate securable to the second cable mounting portion.

11. The cable mounting assembly of claim 10, wherein the first pipe adapter mounting portion of the first modular cable tie-down bracket and the second pipe adapter mounting portion of the second modular cable tie-down bracket is circular in shape.

12. The cable mounting assembly of claim 10, wherein the first pipe adapter mounting portion of the first modular cable tie-down bracket and the second pipe adapter mounting portion of the second modular cable tie-down bracket is U-shaped.

13. The cable mounting assembly of claim 10, wherein the first pipe adapter mounting portion of the first modular cable tie-down bracket and the second pipe adapter mounting portion of the second modular cable tie-down bracket is threaded.

14. The cable mounting assembly of claim 10, wherein the first modular cable tie-down bracket and the second modular cable tie-down bracket include a screw hole.

15. The cable mounting assembly of claim 10, wherein the first modular cable tie-down bracket and the second modular cable tie-down bracket each comprise a grounding stud configured to provide electrical grounding to the respective cable mounting portion.

16. The cable mounting assembly of claim 10, wherein the third portion further defines an opening and the first damping plate includes an anti-rotation tab, the anti-rotation tab insertable into the opening.

17. A modular cable tie-down bracket assembly comprising:
 a pipe adapter configured to be mounted to a hole in a mounting plate for allowing entry and exit of cables;
 a pipe adapter mounting portion configured to be mounted to the pipe adapter;
 a cable mounting portion integrally formed with the pipe adapter mounting portion, the cable mounting portion comprising a first portion extending transversely from the pipe adapter mounting portion, a second portion extending from the first portion parallel to the pipe adapter mounting portion, and a third portion extending transversely from the second portion, the third portion defining intermediate opposing cut-outs, the cut-outs defined in opposing edges of the third portion, the cable mounting portion being configured to mount at least one cable of a plurality of cables passing through the pipe adapter; and
 a clamping plate securable to the third portion of the cable mounting portion,
 wherein the third portion further defines an opening and the clamping plate includes an anti-rotation tab, the anti-rotation tab insertable into the opening.

18. The modular cable tie-down bracket assembly of claim 17, wherein the pipe adapter is a cable grommet.

19. The modular cable tie-down bracket assembly of claim 17, wherein the pipe adapter is a conduit fitting.

\* \* \* \* \*